United States Patent
Seitz et al.

(10) Patent No.: US 12,454,616 B2
(45) Date of Patent: Oct. 28, 2025

(54) ROOM TEMPERATURE VULCANISABLE SILICONE COMPOSITIONS

(71) Applicant: DOW SILICONES CORPORATION, Midland, MI (US)

(72) Inventors: Aaron Seitz, Midland, MI (US); Milton H. Repollet-Pedrosa, Midland, MI (US); Rochelle Nesbitt, Midland, MI (US); Glenn Gordon, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 366 days.

(21) Appl. No.: 17/621,650

(22) PCT Filed: Jun. 23, 2020

(86) PCT No.: PCT/US2020/039035
§ 371 (c)(1),
(2) Date: Dec. 21, 2021

(87) PCT Pub. No.: WO2020/263763
PCT Pub. Date: Dec. 30, 2020

(65) Prior Publication Data
US 2022/0356353 A1  Nov. 10, 2022

Related U.S. Application Data

(60) Provisional application No. 62/867,494, filed on Jun. 27, 2019.

(51) Int. Cl.
| | |
|---|---|
| C08L 83/06 | (2006.01) |
| C09D 5/18 | (2006.01) |
| C09D 7/62 | (2018.01) |
| C09D 183/06 | (2006.01) |
| C09J 5/00 | (2006.01) |
| C09J 11/04 | (2006.01) |
| C09J 183/06 | (2006.01) |
| D06N 3/12 | (2006.01) |
| E04B 1/68 | (2006.01) |
| E04B 1/94 | (2006.01) |
| E04D 7/00 | (2006.01) |

(52) U.S. Cl.
CPC .............. *C08L 83/06* (2013.01); *C09D 5/185* (2013.01); *C09D 7/62* (2018.01); *C09D 183/06* (2013.01); *C09J 5/00* (2013.01); *C09J 11/04* (2013.01); *C09J 183/06* (2013.01); *D06N 3/128* (2013.01); *E04B 1/6801* (2013.01); *E04B 1/947* (2013.01); *E04D 7/00* (2013.01); *C08L 2205/025* (2013.01); *C08L 2312/08* (2013.01); *C09J 2483/00* (2013.01)

(58) Field of Classification Search
CPC ............... C08L 83/06; C08L 2205/025; C08L 2312/08; C08L 83/04; C09D 5/185; C09D 7/62; C09D 183/06; C09D 183/04; C09D 7/61; C09D 7/63; C09J 5/00; C09J 11/04; C09J 183/06; C09J 2483/00; C09J 183/04; D06N 3/128; D06N 5/00; E04B 1/6801; E04B 1/947; E04D 7/00; C08G 77/18; C08G 77/16; C08K 2003/2241; C08K 2003/265

See application file for complete search history.

(56) References Cited

U.S. PATENT DOCUMENTS

| | | | |
|---|---|---|---|
| 4,618,522 A | 10/1986 | Modic | |
| 4,668,315 A * | 5/1987 | Brady | E04D 11/02 |
| | | | 156/304.6 |
| 5,091,484 A | 2/1992 | Colas et al. | |
| 5,502,144 A * | 3/1996 | Kuo | C08L 83/04 |
| | | | 528/21 |

(Continued)

FOREIGN PATENT DOCUMENTS

| | | |
|---|---|---|
| CN | 104177623 A | 12/2014 |
| EP | 0073564 A1 | 3/1983 |
| GB | 2424898 A | 10/2006 |
| WO | 2020263762 A1 | 12/2020 |
| WO | 2020263763 A1 | 12/2020 |

OTHER PUBLICATIONS

International Search Report for PCT/US2020/039034 dated Mar. 23, 2020, 4 pages.
International Search Report for PCT/US2020/039035 dated Feb. 10, 2020, 5 pages.

(Continued)

*Primary Examiner* — Christopher W Raimund
(74) *Attorney, Agent, or Firm* — Warner Norcross + Judd LLP

(57) ABSTRACT

A silicone elastomer composition which is generally storage stable, and cures to an elastomeric body, comprising; (i) an organopolysiloxane polymer having at least two hydroxyl or hydrolysable groups; (ii) a siloxane and/or silane cross-linker having at least three groups per molecule which are reactable with the hydroxyl or hydrolysable groups in the organopolysiloxane polymer (i); (iii) a solid organosilicate resin which is substantially unreactive with components (i) and (ii) and comprising $R_3^2SiO_{1/2}$ and $SiO_{4/2}$ siloxane units, wherein the molar ratio of the $R_3^2SiO_{1/2}$ siloxane units to $SiO_{4/2}$ siloxane units is from 0.5:1 to 1.2:1, and $R^2$ is selected from hydrocarbon groups; and optionally (iv) a suitable condensation cure catalyst. The solid organosilicate resin (iii) is generally utilised to create a low modulus room temperature vulcanisable (RTV) silicone composition which when cured may be used as a coating, an adhesive or a sealant having high movement capability.

17 Claims, No Drawings

(56) References Cited

U.S. PATENT DOCUMENTS

| | | | |
|---|---|---|---|
| 5,705,587 A | 1/1998 | Hatanaka et al. | |
| 6,054,523 A | 4/2000 | Braun et al. | |
| 2009/0226623 A1* | 9/2009 | Liu | C08G 77/16 524/500 |
| 2011/0046304 A1 | 2/2011 | Maliverney | |
| 2015/0376482 A1 | 12/2015 | Bekemeier et al. | |
| 2016/0326320 A1* | 11/2016 | Cifuentes | C08G 77/38 |

OTHER PUBLICATIONS

Machine assisted English translation of CN104177623A obtained from https://patents.google.com on Dec. 26, 2024, 8 pgs.

* cited by examiner

ROOM TEMPERATURE VULCANISABLE SILICONE COMPOSITIONS

CROSS-REFERENCE TO RELATED APPLICATIONS

This application is the U.S. National Stage of International Application No. PCT/US2020/039035 filed on 23 Jun. 2020, which claims priority to and all advantages of U.S. Provisional Application No. 62/867,494 filed on 27 Jun. 2019, the contents of which is incorporated herein by reference.

TECHNICAL FIELD

This relates to a low modulus room temperature vulcanisable (RTV) silicone composition which cures to a low modulus silicone elastomer which may be used as a coating, adhesive or a sealant having high movement capability.

BACKGROUND

Room temperature vulcanizable (RTV) silicone rubber compositions (hereinafter referred to as "RTV compositions") are well known. Generally, such compositions comprise an —OH end-blocked diorganopolysiloxane polymer or an alkoxy end-blocked polydiorganosiloxane which may have an alkylene link between the end silicon atoms and one or more suitable cross-linking agents designed to react with the —OH and/or alkoxy groups and thereby cross-link the composition to form an elastomeric sealant product. One or more additional ingredients such as catalysts, reinforcing fillers, non-reinforcing fillers, diluents (e.g. plasticisers and/or extenders), chain extenders, flame retardants, solvent resistant additives, biocides and the like are often also incorporated into these compositions as and when required. They may be one-part compositions or multiple-part compositions. One-part compositions are generally stored in a substantially anhydrous form to prevent premature cure. The main, if not sole source, of moisture in these compositions are the inorganic fillers, e.g. silica when present. Said fillers may be rendered anhydrous before inter-mixing with other ingredients or water/moisture may be extracted from the mixture during the mixing process to ensure that the resulting sealant composition is substantially anhydrous.

Low modulus room temperature vulcanisable (RTV) silicone compositions can be used in a wide variety of applications. For example, they have achieved considerable commercial success as highway sealants and more recently in the building construction industry. In certain applications, such as the construction of high-rise buildings, it is desirable and often critical to utilize low modulus sealants and/or adhesives for adhering window panes to the frames (metal or otherwise) of a building structure. The low modulus property enables the resulting cured silicone elastomers to easily compress and expand with building movement due to winds and the like without causing cohesive or adhesive failure.

Indeed recent architectural trends towards "mirrored" high rise buildings, that is, high rise buildings where the exterior of the building has the appearance of being a large mirror, for both aesthetic and energy-saving reasons, have resulted in there being a great deal of interest in providing suitable low modulus silicone sealants to deliver such effects.

Low modulus sealants typically rely on high molecular weight/chain length polydiorganosiloxane polymers which are end-blocked with reactive groups but have low levels of reactive groups attached to Silicone atoms along the polymer chain in order to generate cross-linked elastomeric products with low cross-link densities. Such polymers have often been prepared using chain extension processes for which suitable reactive silanes may be utilised as chain extenders during the curing of the composition.

However, the use of such high molecular weight polymers typically results in high viscosity compositions especially when reinforcing fillers are also introduced into the composition. Reinforcing fillers make important contributions to both the cost and rheology of compositions and to properties of resulting elastomeric materials formed from the composition upon cure, for example, abrasion resistance, tensile and tear strength, hardness and modulus. For example, fine particle fumed silicas are used in compositions from which silicone sealants are made in order to improve strength in the cured elastomer. Inclusion of filler as well as the high molecular weight polymers in a liquid composition leads to stiffening of the composition and a reduction in flowability of the composition, which leads to a need for increased applied shear during mixing to achieve the desired homogenous mixed state of the composition as greater amounts of filler are used. This can be a major problem in room temperature cure materials which are often sought to be gunnable i.e. applied by means of pushing uncured sealant out of a sealant tube using a sealant gun.

The introduction of unreactive liquid plasticisers/extenders (sometimes referred to as process aids) has been utilised to produce low modulus sealants. They are used as a means of lowering viscosity of uncured compositions. However, once cured the unreactive liquids within the cured sealant may migrate and potentially bleed out of the sealant which, over an extended period of time, can result in the sealant failing and often causes staining and discoloration in/on adjacent substrates.

Compositions as hereinbefore described having lower viscosities may be utilised as coatings and/or adhesives in a wide variety of applications e.g. in weatherproofing and/or construction applications. Liquid-applied weatherproof coatings can be formed by applying a liquid coating composition onto a suitable construction surface e.g. a wall or roofing surface and allowed to dry or cure as a thin coating or membrane on the wall/roofing surface. It will be appreciated that such coatings having a low modulus are able to cope with movement e.g. expansion and contraction of substrates.

It is an object of this invention to provide low modulus and high elongation silicone elastomeric compositions and elastomers.

SUMMARY

In accordance with the present disclosure there is provided a silicone elastomer composition which is storage stable, and capable of cure to an elastomeric body, the composition comprising
(i) an organopolysiloxane polymer having at least two hydroxyl or hydrolysable groups per molecule of the formula $$X_{3-n}R''Si\text{---}(Z)_d\text{---}(O)_q\text{---}(R^1{}_ySiO_{(4-y)/2})_z\text{---}(SiR^1{}_2\text{---}Z)_d\text{---}Si\text{---}R_nX_{3-n} \qquad (1)$$

in which each X is independently a hydroxyl group or a hydrolysable group, each R is an alkyl, alkenyl or aryl group, each $R^1$ is X group, alkyl group, alkenyl group or aryl group and Z is a divalent organic group;

d is 0 or 1, q is 0 or 1 and d+q=1; n is 0, 1, 2 or 3, y is 0, 1 or 2, and preferentially 2 and z is an integer such that said organopolysiloxane polymer has a viscosity of from 1,000 to 75,000 mPa·s at 25° C., alternatively from 1,000 to 60,000 mPa·s at 25° C.;

(ii) a siloxane and/or silane cross-linker having at least three groups per molecule which are reactable with the hydroxyl or hydrolysable groups in organopolysiloxane polymer (i);

(iii) a solid organosilicate resin, which is substantially unreactive with components (i) and (ii), comprising $R^2_3SiO_{1/2}$ siloxane units and $SiO_{4/2}$ siloxane units, wherein the molar ratio of the $R^2_3SiO_{1/2}$ siloxane units to $SiO_{4/2}$ siloxane units is from 0.5:1 to 1.2:1, $R^2$ is selected from hydrocarbon groups; which organosilicate resin (iii) has a weight average molecular weight of from 3,000 to 30,000 g/mol; and optionally (iv) a suitable condensation cure catalyst.

There is also provided a use of a solid organosilicate resin (iii), which is substantially unreactive with components (i) and (ii), comprising $R^2_3SiO_{1/2}$ siloxane units and $SiO_{4/2}$ siloxane units, wherein the molar ratio of the $R^2_3SiO_{1/2}$ siloxane units to $SiO_{4/2}$ siloxane units is from 0.5:1 to 1.2:1, $R^2$ is selected from hydrocarbon groups; which organosilicate resin (iii) has a weight average molecular weight of from 3000 to 30,000 g/mol to decrease modulus and/or increase elongation of a cured elastomeric body resulting from curing a moisture curable composition otherwise comprising (i) an organopolysiloxane polymer having at least two hydroxyl or hydrolysable groups per molecule of the formula

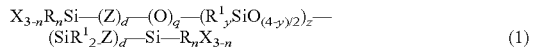

(1)

in which each X is independently a hydroxyl group or a hydrolysable group, each R is an alkyl, alkenyl or aryl group, each $R^1$ is X group, alkyl group, alkenyl group or aryl group and Z is a divalent organic group;

d is 0 or 1, q is 0 or 1 and d+q=1; n is 0, 1, 2 or 3, y is 0, 1 or 2, and preferentially 2 and z is an integer such that said organopolysiloxane polymer has a viscosity of from 1,000 to 75,000 mPa·s at 25° C., alternatively from 1,000 to 60,000 mPa·s at 25° C.;

(ii) a siloxane and/or silane cross-linker having at least three groups per molecule which are reactable with the hydroxyl or hydrolysable groups in organopolysiloxane polymer (i); and optionally (iv) a suitable condensation cure catalyst.

There is still further provided a method of reducing modulus and/or increasing elasticity of an elastomeric body obtained or obtainable by curing a moisture curable composition comprising (i) an organopolysiloxane polymer having at least two hydroxyl or hydrolysable groups per molecule of the formula

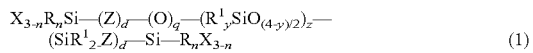

(1)

in which each X is independently a hydroxyl group or a hydrolysable group, each R is an alkyl, alkenyl or aryl group, each $R^1$ is X group, alkyl group, alkenyl group or aryl group and Z is a divalent organic group;

d is 0 or 1, q is 0 or 1 and d+q=1; n is 0, 1, 2 or 3, y is 0, 1 or 2, and preferentially 2 and z is an integer such that said organopolysiloxane polymer has a viscosity of from 1,000 to 75,000 mPa·s at 25° C., alternatively from 1,000 to 60,000 mPa·s at 25° C.;

(ii) a siloxane and/or silane cross-linker having at least three groups per molecule which are reactable with the hydroxyl or hydrolysable groups in organopolysiloxane polymer (i); and optionally (iv) a suitable condensation cure catalyst, by introducing (iii) a solid organosilicate resin, which is substantially unreactive with components (i) and (ii), comprising $R^2_3SiO_{1/2}$ siloxane units and $SiO_{4/2}$ siloxane units, wherein the molar ratio of the $R^2_3SiO_{1/2}$ siloxane units to $SiO_{4/2}$ siloxane units is from 0.5:1 to 1.2:1, $R^2$ is selected from hydrocarbon groups; which organosilicate resin (iii) has a weight average molecular weight of from 3,000 to 30,000 g/mol into the composition prior to cure, and subsequently curing the composition.

There is also provided herein a method for preparing a silicone elastomer composition which is stable in the absence of moisture and cures upon exposure to moisture comprising;

(A) mixing the silicone elastomer composition as hereinbefore described in the absence of moisture and (B) storing the mixture in the absence of moisture.

This mixing is done under essentially anhydrous conditions. Then the resulting composition is put into containers for storage under essentially anhydrous conditions.

There is also provided a method for filling a space between two substrates, so as to create a seal therebetween, comprising:

a) providing a silicone composition as hereinbefore described, and either b) applying the silicone composition to a first substrate, and bringing a second substrate in contact with the silicone composition that has been applied to the first substrate, or c) filling a space formed by the arrangement of a first substrate and a second substrate with the silicone composition and curing the silicone composition.

DETAILED DESCRIPTION

In each of the above viscosity of organopolysiloxane polymer (i) was measured in accordance with ASTM D1084 using a Brookfield rotational viscometer with spindle CP-52 at 1 rpm. Weight average molecular weight was determined using Gel permeation chromatography (GPC).

For the sake of the disclosure herein the term with respect to component (iii) "substantially unreactive" shall be understood to mean an organosilicate resin having <1% by weight of —OH groups. Typically, such small levels of —OH groups may be found inside the resin body and are effectively unreactable with other components in the composition as they are chemically unavailable thereto.

As it is a solid at room temperature and substantially unreactive with polymer (i) and cross-linker (ii), the organosilicate resin (iii) is effectively functioning as an immobile plasticiser/extender (hereafter referred to as a plasticiser), once the elastomeric composition has cured as it is trapped but not chemically bound inside the cross-linked matrix of the elastomer. Given organosilicate resin (iii) is trapped in the cross-linked matrix, unlike liquid plasticisers, it provides the advantage of not being able to migrate from the cross-linked elastomeric network of e.g. a coating, adhesive and/or sealant and as such elastomers plasticised using organosilicate resin (iii) will not cause staining and/or discolouration problems on adjacent substrates because of plasticiser migration from the body of the silicone elastomeric coating, adhesive and/or sealant. That said, the presence of the organosilicate resin (iii) in the composition reduces the viscosity of the composition enabling higher molecular weight polymers to be used as components (i) and potentially (ii). Furthermore, unreactive, organosilicate resin (iii) is compatible with the remaining ingredients of the composition which potentially enables the use of a wider range of cure chemistries than may be the case with some traditional plasticisers which may have compatibility issues given their organic nature.

Organopolysiloxane polymer (i) having at least two hydroxyl or hydrolysable groups per molecule has the formula

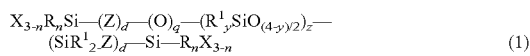
$$X_{3-n}R_nSi-(Z)_d-(O)_q-(R^1{}_ySiO_{(4-y)/2})_z-(SiR^1{}_2Z)_d-Si-R_nX_{3-n} \quad (1)$$

in which each X is independently a hydroxyl group or a hydrolysable group, each R is an alkyl, alkenyl or aryl group, each $R^1$ is an X group, alkyl group, alkenyl group or aryl group and Z is a divalent organic group; d is 0 or 1, q is 0 or 1 and d+q=1; n is 0, 1, 2 or 3, y is 0, 1 or 2, and z is an integer such that said organopolysiloxane polymer (i) has a viscosity of from 1,000 to 75,000 mPa·s at 25° C., alternatively from 1,000 to 60,000 mPa·s at 25° C., in accordance with ASTM D1084 using a Brookfield rotational viscometer with spindle CP-52 at 1 rpm.

Each X group of organopolysiloxane polymer (i) may be the same or different and can be a hydroxyl group or a condensable or hydrolyzable group. The term "hydrolyzable group" means any group attached to the silicon which is hydrolyzed by water at room temperature. The hydrolyzable group X includes groups of the formula —OT, where T is an alkyl group such as methyl, ethyl, isopropyl, octadecyl, an alkenyl group such as allyl, hexenyl, cyclic groups such as cyclohexyl, phenyl, benzyl, beta-phenylethyl; hydrocarbon ether groups, such as 2-methoxyethyl, 2-ethoxyisopropyl, 2-butoxyisobutyl, p-methoxyphenyl or —(CH$_2$CH$_2$O)$_2$CH$_3$.

The most preferred X groups are hydroxyl groups or alkoxy groups. Illustrative alkoxy groups are methoxy, ethoxy, propoxy, isopropoxy, butoxy, isobutoxy, pentoxy, hexoxy octadecyloxy and 2-ethylhexoxy; dialkoxy groups, such as methoxymethoxy or ethoxymethoxy and alkoxyaryloxy, such as ethoxyphenoxy. The most preferred alkoxy groups are methoxy or ethoxy. When d=1, n is typically 0 or 1 and each X is an alkoxy group, alternatively an alkoxy group having from 1 to 3 carbons, alternatively a methoxy or ethoxy group. In such a case organopolysiloxane polymer (i) has the following structure:

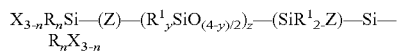
$$X_{3-n}R_nSi-(Z)-(R^1{}_ySiO_{(4-y)/2})_z-(SiR^1{}_2Z)-Si-R_nX_{3-n}$$

With R, $R^1$, Z, y and z being as described above, n being 0 or 1 and each X being an alkoxy group.

Each R is individually selected from alkyl groups, alternatively alkyl groups having from 1 to 10 carbon atoms, alternatively from 1 to 6 carbon atoms, alternatively 1 to 4 carbon atoms, alternatively methyl or ethyl groups; alkenyl groups alternatively alkenyl groups having from 2 to 10 carbon atoms, alternatively from 2 to 6 carbon atoms such as vinyl, allyl and hexenyl groups; aromatic groups, alternatively aromatic groups having from 6 to 20 carbon atoms, substituted aliphatic organic groups such as 3,3,3-trifluoropropyl groups aminoalkyl groups, polyaminoalkyl groups, and/or epoxyalkyl groups.

Each $R^1$ is individually selected from the group consisting of X or R with the proviso that cumulatively at least 2 X groups and/or $R^1$ groups per molecule are hydroxyl or hydrolysable groups. It is possible that some $R^1$ groups may be siloxane branches off the polymer backbone which branches may have terminal groups as hereinbefore described. Most preferred $R^1$ is methyl.

Each Z is independently selected from an alkylene group having from 1 to 10 carbon atoms. In one alternative each Z is independently selected from an alkylene group having from 2 to 6 carbon atoms; in a further alternative each Z is independently selected from an alkylene group having from 2 to 4 carbon atoms. Each alkylene group may for example be individually selected from an ethylene, propylene, butylene, pentylene and/or hexylene group.

Additionally n is 0, 1, 2 or 3, d is 0 or 1, q is 0 or 1 and d+q=1. In one alternatively when q is 1, n is 1 or 2 and each X is an OH group or an alkoxy group. In another alternative when d is 1 n is 0 or 1 and each X is an alkoxy group.

Organopolysiloxane polymer (i) has a viscosity of from 1,000 to 75,000 mPa·s at 25° C., alternatively from 1,000 to 60,000 mPa·s at 25° C., in accordance with ASTM D1084 using a Brookfield rotational viscometer with spindle CP-52 at 1 rpm, z is therefore an integer enabling such a viscosity, alternatively z is an integer from 300 to 5,000. Whilst y is 0, 1 or 2, substantially y=2, e.g. at least 90% alternatively 95% of $R^1{}_ySiO_{(4-y)/2}$ groups are characterized with y=2.

Organopolysiloxane polymer (i) can be a single siloxane represented by Formula (1) or it can be mixtures of organopolysiloxane polymers represented by the aforesaid formula. Hence, the term "siloxane polymer mixture" in respect to organopolysiloxane polymer (i) is meant to include any individual organopolysiloxane polymer (i) or mixtures of organopolysiloxane polymer (i).

The Degree of Polymerization (DP), (i.e. in the above formula substantially z), is usually defined as the number of monomeric units in a macromolecule or polymer or oligomer molecule of silicone. Synthetic polymers invariably consist of a mixture of macromolecular species with different degrees of polymerization and therefore of different molecular weights. There are different types of average polymer molecular weight, which can be measured in different experiments. The two most important are the number average molecular weight (Mn) and the weight average molecular weight (Mw). The Mn and Mw of a silicone polymer can be determined by Gel permeation chromatography (GPC) with precision of about 10-15%. This technique is standard and yields Mw, Mn and polydispersity index (PI). The degree of polymerisation (DP)=Mn/Mu where Mn is the number-average molecular weight coming from the GPC measurement and Mu is the molecular weight of a monomer unit. PI=Mw/Mn. The DP is linked to the viscosity of the polymer via Mw, the higher the DP, the higher the viscosity. Organopolysiloxane polymer (i) is present in the composition in an amount of from 10 to 60% by weight, alternatively 10 to 55%, alternatively 20 to 55% by weight of the composition.

Cross-linker (ii) may be any suitable cross-linker having at least three groups per molecule which are reactable with the hydroxyl or hydrolysable groups in organopolysiloxane polymer (i). Typically, cross-linker (ii) is one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, iso-butoxy and propoxy) and alkenyloxy groups (for example isopropenyloxy and 1-ethyl-2-methylvinyloxy).

In the case of siloxane based cross-linkers the molecular structure can be straight chained, branched, or cyclic.

Cross-linker (ii) preferably has at least three or four hydroxyl and/or hydrolysable groups per molecule which are reactive with the hydroxyl and/or hydrolysable groups in organopolysiloxane polymer (i). When cross-linker (ii) is a silane and when the silane has a total of three silicon-bonded hydroxyl and/or hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic groups is methyl.

Silanes and siloxanes which can be used as cross-linker (ii) include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo) silane, vinyl-tris-methylethylketoximo)silane, methyltris (methylethylketoximino)silane, methyltris(isopropenoxy) silane, vinyltris(isopropenoxy)silane, ethylpolysilicate, n-propylorthosilicate, ethylorthosilicate and/or dimethyltetraacetoxydisiloxane. Cross-linker (ii) may alternatively comprise any combination of two or more of the above.

Alternatively, cross-linker (ii) may comprise a silyl functional molecule containing two or more silyl groups, each silyl group containing at least one —OH or hydrolysable group, the total of number of —OH groups and/or hydrolysable groups per cross-linker molecule being at least 3. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain having a siloxane or organic polymeric backbone. In the case of such siloxane or organic based cross-linker (ii)s the molecular structure can be straight chained, branched, cyclic or macromolecular. In the case of siloxane-based polymers the viscosity of the cross-linker (ii) will be within the range of from 0.5 mPa·s to 80,000 mPa·s at 25° C. was measured in accordance with ASTM D1084 using a Brookfield rotational viscometer with spindle CP-52 at 1 rpm.

For example, cross-linker (ii) may be a disilyl functional polymer, that is, a polymer containing two silyl groups, each having at least one hydrolysable group such as described by the formula

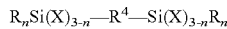

where each R, X and n may be individually selected as hereinbefore described above. $R^4$ is an alkylene (divalent hydrocarbon group), alternatively an alkylene group having from 1 to 10 carbon atoms, or further alternatively 1 to 6 carbon atoms or a combination of said divalent hydrocarbon groups and divalent siloxane groups. Preferred di-silyl functional polymer cross-linkers have n=0 or 1, X=OMe and $R^4$ being an alkylene group with 4 to 6 carbons.

Examples of disilyl polymeric cross-linkers with a silicone or organic polymer chain bearing alkoxy functional end groups include polydimethylsiloxanes having at least one trialkoxy terminal where the alkoxy group may be a methoxy or ethoxy group. Examples might include or 1,6-bis(trimethoxy silyl)hexane, hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxy tetrasiloxane.

The amount of cross-linker present in the composition will depend upon the particular nature of the cross-linker (ii) utilised and in particular, the molecular weight of the molecule selected. The compositions suitably contain cross-linker (ii) in at least a stoichiometric amount as compared to organopolysiloxane polymer (i) described above.

Component (iii) of the present invention is a solid organosilicate resin which is substantially unreactive with organopolysiloxane polymer (i) and cross-linker (ii) comprising $R^2_3SiO_{1/2}$ (M) siloxane units and $SiO_{4/2}$ (Q) siloxane units, wherein the molar ratio of the $R^2_3SiO_{1/2}$ siloxane units to $SiO_{4/2}$ siloxane units is from 0.5:1 to 1.2:1. wherein $R^2$ is selected from hydrocarbon groups and groups but may contain up to 1% by weight of —OH groups. As previously indicated the organosilicate resin (iii) is substantially unreactive which is defined as having <1% by weight of —OH groups which are effectively all within the bulk resin structure and are not chemically available to components (i) and (ii) above. Organosilicate resin (iii) has a weight average molecular weight of from 3,000 to 30,000 g/mol.

Siloxy units may be described by a shorthand (abbreviated) nomenclature, namely—"M," "D," "T," and "Q", when $R^1$ is e.g. a methyl group (further teaching on silicone nomenclature may be found in Walter Noll, Chemistry and Technology of Silicones, dated 1962, Chapter I, pages 1-9). The M unit corresponds to a siloxy unit where a=3, that is $R'_3SiO_{1/2}$; the D unit corresponds to a siloxy unit where a=2, namely $R'_2SiO_{2/2}$; the T unit corresponds to a siloxy unit where a=1, namely $R'_1SiO_{3/2}$; the Q unit corresponds to a siloxy unit where a=0, namely $SiO_{4/2}$. Hence, component (iii) may be referred to as an MQ resin.

In the formula for organosilicate resin (iii), $R^2$ denotes a monovalent group selected from hydrocarbon groups, preferably having less than 20 carbon atoms and, most preferably, having from 1 to 10 carbon atoms. Examples of suitable $R^2$ groups include alkyl groups, such as methyl, ethyl, propyl, pentyl, octyl, undecyl and octadecyl; cycloaliphatic groups, such as cyclohexyl; aryl groups such as phenyl, tolyl, xylyl, benzyl, alpha-methyl styryl and 2-phenylethyl; alkenyl groups such as vinyl; and chlorinated hydrocarbon groups such as 3-chloropropyl and dichlorophenyl.

Preferably, at least two-thirds and, more preferably, substantially all (i.e. greater than 99% by weight) $R^2$ groups in component (iii), are alkyl groups, alkenyl groups and/or aryl groups. Examples of preferred $R_3SiO_{1/2}$ (M) siloxane units include $Me_3SiO_{1/2}$, $PhMe_2SiO_{1/2}$ and $Ph_2MeSiO_{1/2}$, where Me hereinafter denotes methyl and Ph hereinafter denotes phenyl.

Organosilicate resin (iii) includes a resinous portion wherein the $R^2_3SiO_{1/2}$ siloxane units (i.e., M units) are bonded to the $SiO_{4/2}$ siloxane units (i.e., Q units), each of which Q group is bonded to at least one other $SiO_{4/2}$ siloxane unit. Some $SiO_{4/2}$ siloxane units are bonded to hydroxyl groups resulting in $HOSiO_{3/2}$ units (which may be referred to as TOH units), however, substantially all (i.e. >95%) of such groups are situated within the resinous structure and thereby are non-reactive with other components within the composition, i.e. organopolysiloxane polymer (i) and cross-linker (ii). In addition to the resinous portion, organosilicate resin (iii) can contain a small amount of a low molecular weight material comprised substantially of a neopentamer organopolysiloxane having the formula $(R_3SiO)_4Si$, the latter material being a byproduct in the preparation of the organosilicate resin.

The molar ratio of $R_3SiO_{1/2}$ (M) siloxane units to $SiO_{4/2}$ (Q) siloxane units is from 0.5:1 to 1.2:1, alternatively 0.6:1 to 1.2:1 respectively, alternatively between 0.6:1 and 0.8:1. The above M:Q molar ratios can be easily obtained by $^{29}Si$ nuclear magnetic resonance (NMR), this technique being capable of a quantitative determination of the molar contents of: M(resin), M(neopentamer), Q(resin), Q(neopentamer) and TOH. For the purposes of the present invention, as implicitly stated supra, the M:Q ratio {M(resin)+M(neopentamer)}/{Q(resin)+Q(neopentamer)} represents the ratio of the total number of triorganosiloxy groups of the resinous and neopentamer portions of (i) to the total number of silicate groups of the resinous and neopentamer portions of (iii). It will, of course, be understood that the above definition of the M/Q molar ratio accounts for the neopentamer resulting from the preparation of organosilicate resin (iii) and not for any intentional addition of neopentamer.

Organosilicate resin (iii) is a solid at room temperature. That is, it must have a softening point above room temperature (RT), preferably above 40° C. This is because the solid organosilicate resin is being utilised in the present composition as a solid plasticiser which is effectively immobile within the ultimately cured elastomeric material, being physically trapped in place within the cured elastomeric matrix.

The resinous portion of component (iii) has a weight average molecular weight(Mw) of 3,000 to 30,000 when measured by gel permeation chromatography (GPC), the neopentamer peak being excluded from the measurement. In this molecular weight determination, narrow fractions of MQ resins are used to calibrate the GPC equipment, the absolute molecular weights of the fractions being first ascertained by a technique such as vapor phase osmometry. The hydroxyl content of the organosilicate resin is <1% by weight of the organosilicate resin.

Component (iii) can be prepared by any suitable method. For example, by the silica hydrosol capping process of U.S. Pat. No. 2,676,182; as modified by U.S. Pat. Nos. 3,627,851 and 3,772,247. These methods employ an organic solvent, such as toluene or xylene and provide a solution wherein the organosilicate resin is designed to have a hydroxyl content <1% by weight (based on the weight of resin solids). The resulting organosilicate resin is capped with non-reactive M groups e.g. trialkylsiloxy groups and/or dialkylvinyl siloxy groups to minimise reactive —OH groups using well-known methods, such as reacting the organosilicate resin with trimethylchlorosilane or hexamethyldisilazane.

Some of the compositions disclosed herein do not require a catalyst to aid in curing the composition although suitable catalysts may be used if appropriate. The composition may comprise a condensation catalyst (iv). This increases the speed at which the composition cures. The catalyst (iv) chosen for inclusion in a particular silicone sealant composition depends upon the speed of cure required.

Catalyst (iv) may be a tin based catalyst. Tin based catalysts are typically used in compositions which are stored in two-parts and mixed together immediately prior to use as discussed further below. Suitable tin based condensation catalysts (iv) include tin triflates, organic tin metal catalysts such as triethyltin tartrate, tin octoate, tin oleate, tin naphthate, butyltintri-2-ethylhexoate, tin butyrate, carbomethoxyphenyl tin trisuberate, isobutyltintriceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dimethyltin dineodecanoate (DMTDN) and dibutyltin dioctoate. The tin catalyst may be present in an amount of from 0.01 to 3 weight % by weight of the composition; alternatively, 0.1 to 0.75 weight % of the composition.

Titanate and/or zirconate based catalysts (iv) are more often utilised in one-part sealant compositions, i.e. compositions not requiring mixing prior to use. Suitable titanate and/or zirconate based catalysts (iv) may comprise a compound according to the general formula $M[OR^6]_4$ where M is titanium or zirconium and each $R^6$ may be the same or different and represents a monovalent, primary, secondary or tertiary aliphatic hydrocarbon group which may be linear or branched containing from 1 to 10 carbon atoms. Optionally the titanate may contain partially unsaturated groups. However, preferred examples of $R^6$ include but are not restricted to methyl, ethyl, propyl, isopropyl, butyl, tertiary butyl and a branched secondary alkyl group such as 2,4-dimethyl-3-pentyl. Preferably, when each $R^6$ is the same, $R^6$ is an isopropyl, branched secondary alkyl group or a tertiary alkyl group, in particular, tertiary butyl. Suitable examples include for the sake of example, tetra n-butyl titanate, tetra t-butyl titanate, tetra t-butoxy titanate, tetraisopropoxy titanate and diisopropoxydiethylacetoacetate titanate. Alternatively, the titanate may be chelated. The chelation may be with any suitable chelating agent such as an alkyl acetylacetonate such as methyl or ethylacetylacetonate. Alternatively, the titanate may be monoalkoxy titanates bearing three chelating agents such as for example 2-propanolato, tris isooctadecanoato titanate. The titanium or zirconium-based catalyst may be present in an amount of from 0.01 to 3 weight % by weight of the composition; alternatively, 0.1 to 0.75 weight % of the composition.

Optional Additives

Compositions as hereinbefore described may contain one or more fillers. The fillers may be reinforcing or non-reinforcing. Reinforcing fillers may contain one or more finely divided, reinforcing fillers such as precipitated calcium carbonate, fumed silica and/or precipitated silica including, for example, rice hull ash. Typically, the surface area of the reinforcing filler is at least 15 $m^2/g$ in the case of precipitated calcium carbonate measured in accordance with the BET method in accordance with ISO 9277: 2010, alternatively 15 to 50 $m^2/g$, alternatively 15 to 25 $m^2/g$ in the case of precipitated calcium carbonate. Silica reinforcing fillers have a typical surface area of at least 50 $m^2/g$. In one embodiment reinforcing filler is a precipitated calcium carbonate, precipitated silica and/or fumed silica; alternatively, precipitated calcium carbonate. In the case of high surface area fumed silica and/or high surface area precipitated silica, these may have surface areas of from 100 to 400 $m^2/g$ measured in accordance with the BET method in accordance with ISO 9277: 2010, alternatively of from 100 to 300 $m^2/g$ in accordance with the BET method in accordance with ISO 9277: 2010, may be chosen for use. When present the reinforcing fillers are present in the composition in an amount of from up to 70% by weight of the composition, alternatively, 20 to 70% by weight, alternatively from 35 to 65% by weight of the composition, alternatively from 40 to 60% by weight of the composition.

When present the reinforcing filler may be hydrophobically treated for example with a fatty acid e.g. stearic acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other adhesive components The surface treatment of the fillers makes them easily wetted by organopolysiloxane polymer (i). These surface modified fillers do not clump and can be homogeneously incorporated into the silicone organopolysiloxane polymer (i) of the base component. This results in improved room temperature mechanical properties of the uncured compositions. The fillers may be pre-treated or may be treated in situ when being mixed with organopolysiloxane polymer (i).

Non-reinforcing fillers, which might be used alone or in addition to the above include aluminite, calcium sulphate (anhydrite), gypsum, nepheline, svenite, quartz, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$.

The ring silicates group comprises silicate minerals, such as but not limited to, cordierite and $Al_3(Mg,Fe)_2[Si_4AlO_{18}]$. The chain silicates group comprises ground silicate minerals, such as but not limited to, wollastonite and $Ca[SiO_3]$.

The sheet silicates group comprises silicate minerals, such as but not limited to, mica; $K_2Al_{14}[Si_6Al_2O_{20}](OH)_4$; pyrophyllite; $Al4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate ester, stearic acid, salts of stearic acid, calcium stearate and carboxylatepolybutadiene. Treating agents based on silicon containing materials may include organosilanes, organosiloxanes, or organosilazanes hexaalkyl disilazane or short chain siloxane diols to render the filler(s) hydrophobic and therefore easier to handle and obtain a homogeneous mixture with the other sealant components. The surface treatment of the fillers makes the ground silicate minerals easily wetted by the silicone polymer. These surface modified fillers do not clump and can be homogeneously incorporated into the silicone polymer. This results in improved room temperature mechanical properties of the uncured compositions. Furthermore, the surface treated fillers give a lower conductivity than untreated or raw material.

The composition of the invention can also include other ingredients known for use in moisture curable compositions based on silicon-bonded hydroxyl or hydrolysable groups such as sealant compositions.

Liquid Plasticisers/Extenders

Whilst organosilicate resin (iii) provides the composition as hereinbefore described with plasticising properties, although not preferred, the composition may also comprise one or more liquid plasticizers/extenders (sometimes referred to as processing aids) in the form of a silicone or organic fluid which is unreactive with organopolysiloxane polymer(s) (i) crosslinker(s) (ii) and organosilicate resin (iii), whether reactive or unreactive.

Examples of non-reactive silicone fluids useful as plasticizers and which may be included in the two-part composition, include polydiorganosiloxanes such as polydimethylsiloxane having terminal triorganosiloxy groups wherein the organic substituents are, for example, methyl, vinyl or phenyl or combinations of these groups. Such polydimethylsiloxanes can for example have a viscosity of from about 5 to about 100,000 mPa·s at 25° C. When present, these can be in part A or in part B of the two-part composition with the cross-linker (ii) and catalyst.

Alternatively compatible organic plasticisers may be utilised additionally to or instead of the silicone fluid plasticiser include dialkyl phthalates wherein the alkyl group may be linear and/or branched and contains from six to 20 carbon atoms such as dioctyl, dihexyl, dinonyl, didecyl, diallanyl and other phthalates, and analogous adipate, azelate, oleate and sebacate esters; polyols such as ethylene glycol and its derivatives; and organic phosphates such as tricresyl phosphate and/or triphenyl phosphates.

Examples of extenders for use in compositions herein include mineral oil based (typically petroleum based) paraffinic hydrocarbons, mixtures of paraffinic and naphthenic hydrocarbons, paraffin oils comprising cyclic paraffins and non-cyclic paraffins and hydrocarbon fluids containing naphthenics, polycyclic naphthenics and paraffins, or polyalkylbenzenes such as heavy alkylates (alkylated aromatic materials remaining after distillation of oil in a refinery). Examples of such extenders are discussed in GB2424898 the content of which is hereby enclosed by reference.

If present the plasticizer or extender content will be present in an amount of from >0 to 10% by weight of the composition. Preferably however, the composition contains no liquid plasticiser/extender or only contains liquid plasticiser/extender at impurity levels (e.g. <0.5% by weight of the composition).

Other ingredients which may be included in coating, adhesive and/or sealant compositions derived the RTV curable elastomeric composition above include but are not restricted to rheology modifiers; adhesion promoters, pigments, heat stabilizers, flame retardants, UV stabilizers, chain extenders, cure modifiers, electrically and/or heat conductive fillers, and fungicides and/or biocides and the like.

Rheology Modifiers

Rheology modifiers which may be incorporated in moisture curable compositions according to the invention include silicone organic co-polymers such as those described in EP 0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion of the sealant to substrates, particularly plastic substrates.

Adhesion Promoters

Examples of adhesion promoters which may be incorporated in moisture curable compositions according to the invention include alkoxysilanes such as aminoalkylalkoxysilanes, for example 3-aminopropyltriethoxysilane, epoxyalkylalkoxysilanes, for example, 3-glycidoxypropyltrimethoxysilane and, mercapto-alkylalkoxysilanes, and reaction products of ethylenediamine with silylacrylates. Isocyanurates containing silicon groups such as 1,3,5-tris (trialkoxysilylalkyl) isocyanurates may additionally be used. Further suitable adhesion promoters are reaction products of epoxyalkylalkoxysilanes such as 3-glycidoxypropyltrimethoxysilane with amino-substituted alkoxysilanes such as 3-aminopropyltrimethoxysilane and optionally with alkylalkoxysilanes such as methyltrimethoxysilane.

Chain Extenders

Chain extenders may include difunctional silanes which extend the length of the polysiloxane polymer chains before cross linking occurs and, thereby, reduce the modulus of elongation of the cured elastomer. Chain extenders and crosslinkers compete in their reactions with the functional polymer ends; in order to achieve noticeable chain extension, the difunctional silane must have substantially higher reactivity than the trifunctional crosslinker with which it is used. Suitable chain extenders include diamidosilanes such as dialkyldiacetamidosilanes or alkenylalkyldiacetamidosilanes, particularly methylvinyldi(N-methylacetamido)silane, or dimethyldi(N-methylacetamido)silane, diacetoxysilanes such as dialkyldiacetoxysilanes or alkylalkenyldiacetoxysilanes, diaminosilanes such as dialkyldiaminosilanes or alkylalkenyldiaminosilanes, dialkoxysilanes such as dimethoxydimethylsilane, diethoxydimethylsilane and α-aminoalkyldialkoxyalkylsilanes, polydialkylsiloxanes having a degree of polymerization of from 2 to 25 and having at least three acetamido or acetoxy or amino or alkoxy or amido or ketoximo substituents per molecule, and diketoximinosilanes such as dialkylkdiketoximinosilanes and alkylalkenyldiketoximinosilanes.

Pigments

Pigments are utilised to colour the composition as required. Any suitable pigment may be utilised providing it is compatible with the composition. In two-part compositions pigments and/or coloured (non-white) fillers e.g. carbon black may be utilised typically in one-part of the composition and may be relied upon to show good mixing of the different parts prior to application.

Biocides

Biocides may additionally be utilized in the composition if required. It is intended that the term "biocides" includes bactericides, fungicides and algicides, and the like. Suitable examples of useful biocides which may be utilised in compositions as described herein include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl]methyl]-1H-1,2,4-triazole.

The fungicide and/or biocide may suitably be present in an amount of from 0 to 0.3% by weight of the composition and may be present in an encapsulated form where required such as described in EP2106418.

The amounts of the ingredients used in the composition described herein are chosen so that the composition, when cured for 14 days at 25° C. exposed to air having 50% relative humidity, results in a cured silicone elastomer having an elongation of from 300% alternatively 600% up to 1200%, and a modulus at 50% and 100% elongation of less than 25 psi (172.4 kPa) as tested in accordance with ASTM D412.

The silicone elastomer as hereinbefore described is typically made from a condensation curable composition which may be stored in a single component, if uncatalysed or catalysed with a titanium and/or zirconium based catalyst or may be stored in a 2 part manner, particularly if cured in the presence of a tin based catalyst. The two-part compositions may be mixed using any appropriate standard two-part mixing equipment with a dynamic or static mixer and is optionally dispensed therefrom for use in the application for which it is intended. When the condensation curable composition is stored in two-parts, the composition may be stored as follows, having polymer (i) together with cross-linker (ii) in one-part and polymer (i) together with catalyst (iv) in the other part. In an alternative embodiment the condensation curable composition is stored in two-parts having cross-linker (ii) in one-part and polymer (i), and catalyst (iv) in the other part. In a still further embodiment the condensation curable composition is stored in two-parts having a polymer (i), and optionally cross-linker (ii) in one-part and a cross-linker (ii) and catalyst (iv) in the other part. As resin (iii) is substantially unreactive, as defined above, it may be stored in any or both parts as desired.

The term polydiorganosiloxane as used herein does not preclude small amounts of other siloxane units such as monoorganosiloxane units. The hydroxyl end-blocked polydiorganosiloxanes are known in the art and can be made by known commercial methods. The preferred hydroxyl end-blocked polydiorganosiloxane is hydroxyl end-blocked polydimethylsiloxane.

Without being bound by current theories, it is believed that the substantially non-reactive organosilicate resin as described herein is effectively functioning as a solid plasticiser wherein particles of the organosilicate resin post cure are physically entrapped within the elastomeric network, thereby providing plasticisation without the long term historic problem within the industry of plasticiser/extender bleed out which in time may ultimately cause the failure of the sealant. Hence the composition as hereinbefore described provides a liquid diluent free, (i.e. no plasticiser and no extender in liquid form) low modulus silicone sealant composition, which upon cure, has a high movement capability.

The ingredients and their amounts are designed to provide a low modulus and high extension sealant, adhesive and/or coating composition. Low modulus silicone sealant compositions are preferably "gunnable" i.e. they have a suitable extrusion capability i.e. a minimum extrusion rate of 10 ml/min as measured by ASTM C1183, alternatively 10 to 1,000 mL/min, and alternatively 100 to 1,000 mL/min.

The ingredients and their amounts in the sealant composition are selected to impart a movement capability to the post-cured sealant material. The movement capability is greater than 25%, alternatively movement capability ranges from 25% to 50%, as measured by ASTM C719.

A sealant composition as hereinbefore described may be a gunnable sealant composition used for
- (a) space/gap filling applications;
- (b) seal applications, such as sealing the edge of a lap joint in a construction membrane; or
- (c) seal penetration applications, e.g., sealing a vent in a construction membrane;
- (d) adhering at least two substrates together.
- (e) a laminating layer between two substrates to produce a laminate of the first substrate, the sealant product and the second substrate.

In the case of (e) above when used as a layer in a laminate, the laminate structure produced is not limited to these three layers. Additional layers of cured sealant and substrate may be applied. The layer of gunnable sealant composition in the laminate may be continuous or discontinuous.

A sealant composition as hereinbefore described may be applied on to any suitable substrate. Suitable substrates may include, but are not limited to, glass; concrete; brick; stucco; metals, such as aluminium, copper, gold, nickel, silicon, silver, stainless steel alloys, and titanium; ceramic materials; plastics including engineered plastics such as epoxies, polycarbonates, poly(butylene terephthalate) resins, polyamide resins and blends thereof, such as blends of polyamide resins with syndiotactic polystyrene such as those commercially available from The Dow Chemical Company, of Midland, Michigan, U.S.A., acrylonitrile-butadiene-styrenes, styrene-modified poly(phenylene oxides), poly(phenylene sulfides), vinyl esters, polyphthalamides, and polyimides; cellulosic substrates such as paper, fabric, and wood; and combinations thereof. When more than one substrate is used, there is no requirement for the substrates to be made of the same material. For example, it is possible to form a laminate of plastic and metal substrates or wood and plastic substrates.

In the case of silicone sealant compositions as hereinbefore described, there is provided a method for filling a space between two substrates so as to create a seal therebetween, comprising:
- a) providing a silicone composition as hereinbefore described, and either
- b) applying the silicone composition to a first substrate, and bringing a second substrate in contact with the silicone composition that has been applied to the first substrate, or
- c) filling a space formed by the arrangement of a first substrate and a second substrate with the silicone composition and curing the silicone composition.

Alternatively or additionally there may also be provided a method for adhering a construction membrane to a structure comprises:
- I) applying a gunnable adhesive composition as described above to a first substrate,
- II) hardening the gunnable adhesive composition to form an adhesive product, and
- III) adhering the first substrate to a second substrate through the adhesive product.

The first substrate may be the construction membrane, and the second substrate may be the structure. Alternatively, the first substrate may be the structure, and the second substrate may be the construction membrane. Alternatively, the first substrate and the second substrate may each be a construction membrane, with the proviso that the first substrate and the second substrate may be the same or different construction membranes.

In one alternative, a sealant composition as hereinbefore described may be a self-levelling highway sealant. A self-levelling sealant composition means it is "self-levelling" when extruded from a storage container into a horizontal joint; that is, the sealant will flow under the force of gravity sufficiently to provide intimate contact between the sealant and the sides of the joint space. This allows maximum adhesion of the sealant to the joint surface to take place. The self-levelling also does away with the necessity of tooling the sealant after it is placed into the joint, such as is required with a sealant which is designed for use in both horizontal and vertical joints. Hence, the sealant flow sufficiently well to fill a crack upon application. If the sealant has sufficient flow, under the force of gravity, it will form an intimate contact with the sides of the irregular crack walls and form a good bond; without the necessity of tooling the sealant after it is extruded into the crack, in order to mechanically force it into contact with the crack sidewalls.

Self-levelling compositions as described herein are useful as a sealant having the unique combination of properties required to function in the sealing of asphalt pavement. Asphalt paving material is used to form asphalt highways by building up an appreciable thickness of material, such as 20.32 cm, and for rehabilitating deteriorating concrete highways by overlaying with a layer such as 10.16 cm. Asphalt overlays undergo a phenomenon known as reflection cracking in which cracks form in the asphalt overlay due to the movement of the underlying concrete at the joints present in the concrete. These reflection cracks need to be sealed to prevent the intrusion of water into the crack, which will cause further destruction of the asphalt pavement when the water freezes and expands.

In order to form an effective seal for cracks that are subjected to movement for any reason, such as thermal expansion and contraction, the seal material must bond to the interface at the sidewall of the crack and must not fail cohesively when the crack compresses and expands. In the case of the asphalt pavement, the sealant must not exert enough strain on the asphalt at the interface to cause the asphalt itself to fail; that is, the modulus of the sealant must be low enough that the stress applied at the bondline is well below the yield strength of the asphalt.

In such instances, the modulus of the cured material is designed to be low enough so that it does not exert sufficient force on the asphalt to cause the asphalt to fail cohesively. The cured material is such that when it is put under tension, the level of stress caused by the tension decreases with time so that the joint is not subjected to high stress levels, even if the elongation is severe.

Alternatively, the silicone elastomeric composition provided herein may be utilised as an elastomeric coating composition, e.g. as a barrier coating for construction materials or as a weatherproof coating for a roof, the composition may have a viscosity not dissimilar to a paint thereby enabling application by e.g. brush, roller or spray gun or the like. A coating composition as described herein, when applied onto a substrate, may be designed to provide the substrate with e.g. long-term protection from air and water infiltration, under normal movement situations caused by e.g. seasonal thermal expansion and/or contraction, ultra-violet light and the weather. Such a coating composition can maintain water protection properties even when exposed to sunlight, rain snow or temperature extremes.

Hence, there is also provided herein a wall and/or roof assembly comprising an elastomeric coating which is the reaction product resulting from curing a liquid applied, composition as hereinbefore described. The composition may be applied on to a substrate at any suitable wet thickness, such as for example from 0.50 mm to 1.75, alternatively 0.50 mm to 1.5 mm and may dry subsequent to application to a dry thickness of from 0.25 mm to 0.80 mm. It may be applied onto any suitable construction substrate, such as a roofing substrate, a construction sheathing substrate, a metal substrate such as a painted or unpainted aluminium substrate, a galvanized metal substrate, a wood framing substrate, concrete masonry, foam plastic insulated sheeting, exterior insulation, pre-formed concrete, cast in place concrete wood framing, oriented strand board (OSB), exterior sheathing, a preformed panel, plywood and wood, a steel stud wall, roofing felting for roofing membranes, and/or anon-permeable wall assembly.

In the case of a roofing surface, The roofing surface may be of any suitable construction material for example, slates and tiles and/or reinforced concrete; nailable, lightweight concrete; poured gypsum; formed metal; and wood, (e.g. in the form of planks or plywood sheets) as well as single ply roofing membranes such as ethylene propylene diene monomer rubber (EPDM), thermoplastic olefins (TPO) and modified bitumen (mod-bit) base sheets, cap sheets or flashings.

Given silicone materials are significantly more resistant to temperature change than many alternatives used to form elastomeric roofing membranes, or to repair waterproof membranes an elastomeric coating made from the composition as hereinbefore described will remain elastomeric at high and low temperatures and as such is far less likely to split or crack due to building movements and/or temperature variation not least because of the low modulus resulting from the presence of resin (iii). Furthermore, even if moisture penetration does occur e.g. due to a faulty moisture barrier layer in the roofing construction (e.g. under a layer of roof insulation), the moisture can escape through the silicone elastomeric coating on the membrane, even though it is impervious to liquid water. Indeed, one added advantage is that a composition as provided herein may also be utilised as the aforementioned moisture barrier, which will of course be an added advantage from a compatibility perspective.

As previously indicated compositions as hereinbefore described may also be utilised as vapor barriers in a roofing system in combination with e.g. insulation materials. They may be placed in any suitable order to form the roof. Typical insulation materials may include, for the sake of example mineral or vegetable fiber boards, rigid glass fiber insulation, glass-bead board, rigid urethane board or sprayed coating, foamed polystyrene board, and composite board. The insulation may be attached to the roof deck with adhesives such as an adhesive composition as hereinbefore described other adhesives and/or mechanical fasteners if preferred.

In one embodiment there is provided a method of weatherproofing a roofing surface by applying an elastomeric coating composition as hereinbefore described over a roofing surface or substrate using the following sequential steps: (A) laying a piece or pieces of roofing fabric over a roofing construction substrate surface; (B) if required bonding pieces of roofing fabric together at any seams; (C) adhering the roofing fabric to the roofing construction substrate surface at least at all edges and projections; (D) coating the roofing fabric with an elastomeric coating composition as hereinbefore described; and (E) Curing the elastomeric coating composition to form a water impermeable membrane.

Typically, the elastomeric coating composition will at least partially penetrate the roofing fabric prior to cure and as such the resulting elastomeric coating will be in and/or on the roofing fabric once cured.

The roofing construction substrate may be of any suitable material. For example, it may consist of a structured deck of wood, concrete and or metal on which are one or more layers of vapour barrier(s) and/or insulation. Indeed, the vapour barrier provided may be a layer of the composition as hereinbefore described.

In a still further embodiment there is provided a method of coating a pre-prepared weatherproof roofing membrane by coating said membrane with at least one coat of an elastomeric coating composition as hereinbefore described and allowing said coating to cure. In such a process the coating may be a top-coat for a new roof to enhance weatherproofing or may be used as a remedial renovating process in situ as a means of weatherproofing a leaking roof and or roofing membrane.

In the case of the remedial renovating process, this may be carried out e.g. by applying a layer of the coating composition as hereinbefore described directly onto a roofing membrane surface. In such a situation the roofing surface will typically be a waterproof roofing membrane (e.g. as described above) on top of any appropriate roofing construction. For example, it may consist of a structured deck of wood, concrete and or metal on which are one or more layers of vapour barrier(s) and/or insulation on top of which is the waterproof roofing membrane and the composition herein is applied on top of the waterproof roofing membrane as a remedial measure.

In a still further embodiment of the present disclosure an elastomeric coating composition as hereinbefore described may be utilised in the preparation of a waterproof roofing membrane by treating a roofing fabric with an elastomeric coating composition as hereinbefore described such that the roofing fabric onto which the composition is applied, effectively acts as a reinforcement for the silicone elastomeric coating resulting from application and curing the composition. Any suitable roofing fabric can be used, but roofing fabric constructed of fibers which do not absorb excessive amounts of water and which have some degree of elasticity are preferred, e.g. felt and nonwoven roofing fabrics are preferable. These may include but are not restricted to polypropylene and polyester fibers made into nonwoven roofing fabric and spun-bonded roofing fabric. Typically, the roofing fabric may be up to about 3 mm thick, alternatively from about 0.1 mm to 2 mm.

The roofing fabric can be adhered to the roofing construction surface as it is being laid, although there is no necessity, usually to adhere all the roofing fabric to the surface under it. For example, a composition as hereinbefore described may be applied to the roofing frame or support surface in a random pattern of spots or lines and then the roofing fabric can be placed over the adhesive and be pressed down into the adhesive. If it is desired to adhere the complete roofing fabric on to the roofing surface the silicone adhesive might be applied by brush or spray or rolling on to the roofing surface before application of the roofing fabric with the roofing fabric being subsequently placed onto the adhesive coating.

A composition as hereinbefore described may be utilised as an adhesive. In one example the adhesive might be used for adhering two suitable substrates together, e.g. for bonding in a roofing application adhering roofing fabric seams together and/or for adhering a roofing fabric to a roofing substrate. The adhesive may be extruded from a storage tube or the like around the edge of the roofing surface, then the roofing fabric may be placed on top of the adhesive and then pressed down over the bead of adhesive. When the adhesive cures, it bonds the roofing fabric to the roofing surface. In some cases, depending upon the nature of the roofing surface and the type of adhesive being used, it may be necessary to first prime the roofing surface before applying the adhesive. Other applications where the composition as hereinbefore described is used as an adhesive includes but are not limited to use as a flashing adhesive.

A liquid elastomeric composition as hereinbefore described may, providing the uncured composition has a sufficiently low viscosity, be applied onto suitable substrates by spraying, brushing, rolling or flooding and squeegeeing. When used as a remedial topcoat or as a means of forming a waterproof membrane on a new roofing construction, the composition herein may be designed to cure at a speed such that the skin over time (SOT) is from about 20 minutes to 3 hours, alternatively 30 minutes to 2 hours, alternatively from 30 minutes to one hour. The skin over time is the time taken for a cured skin to occur at the air/coating interface. An SOT time of this duration is advantageous because the user needs a sufficient application and working time period to apply and if necessary work the composition and as such a fast curing composition, e.g. curing in 15 minutes or less after application is not generally desired for these types of applications. If required two or more coats of the coating composition as hereinbefore described may be applied onto a substrate, typically drying the first coat before applying the second.

The following examples are included for illustrative purposes only and should not be construed as limiting the disclosure herein which is properly set forth in the appended claims. Parts are parts by weight. Viscosity measurements are given at 25° C. and were measured in accordance with ASTM D1084 using a Brookfield rotational viscometer with spindle CP-52 at 1 rpm.

The following examples are included for illustrative purposes only and should not be construed as limiting the disclosure herein which is properly set forth in the appended claims. The amount of each component of a composition present is provided in weight % (% wt.). All wet peel adhesion tests were undertaken in accordance ASTM C794 with one modification, Tietex® Roofing Fabric from Tietex International Limited of Spartanburg, SC, USA was used as the substrate instead of the usual metal wire mesh.

Sealant/Adhesive Compositions

Tables 1 and 2 depict sealant/adhesive compositions in accordance with the disclosure herein. The Tables 1 relate to the use of unreactive organosilicate resins, whilst Tables 2 provides comparative examples using reactive resins. In the Tables:

Polymer 1 is a polydimethylsiloxane terminated with $(CH_3O)_3$—Si—$(CH_2)_2$—Si (i.e. where each X is a methoxy group, Z is a diethylene group, n is zero and d is 1 in Structure 1) having a viscosity of 2,000 mPa·s at 25° C.;

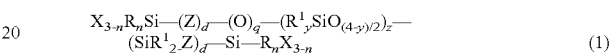

$$X_{3-n}R_nSi-(Z)_d-(O)_q-(R^1_ySiO_{(4-y)/2})_z- \\ (SiR^1_2Z)_d-Si-R_nX_{3-n} \qquad (1)$$

Polymer 2 is a polydimethylsiloxane terminated with $(CH_3O)_3$—Si—$(CH_2)_2$—Si (i.e. where each X is a methoxy group, Z is a diethylene group, n is zero and d is 1 in Structure 1 above) having a viscosity of 56,000 mPa·s at 25° C.;

Resin 1 is a dimethylvinyl terminated MQ resin having a vinyl content of 2.2 weight %, a molar ratio of M groups to Q groups of 43:57 and $M_W$ of 21,000;

Treated ground $CaCO_3$ is a ground calcium carbonate treated with ammonium stearate having an average particle size of 3 μm; and Treated precipitated $CaCO_3$ is a precipitated calcium carbonate which has been treated with stearic and which has an average particle size of 0.1 μm.

Table 1a depicts a series of coating compositions in accordance with the composition as hereinbefore described.

TABLE 1a

| Coating formulation | | | | | | |
|---|---|---|---|---|---|---|
| | Ref. 2 (% wt.) | Ref 3 (% wt.) | Ex. 3 (% wt.) | Ex. 4 (% wt.) | Ex. 5 (% wt.) | Ex. 6 (% wt.) |
| Polymer 1 | 50.00 | | 28.00 | 34.00 | 30.00 | |
| Polymer 2 | | 50.00 | | | | 30.00 |
| Resin 1 | | | 12.00 | 16.00 | 20.00 | 20.00 |
| methyltrimethoxysilane | 3.00 | 2.00 | 3.00 | 3.00 | 3.00 | 2.00 |
| Titanium diisopropyldiethylacetoacetate | 0.75 | 0.75 | 0.75 | 0.75 | 0.75 | 0.75 |
| aminoethylaminopropyltrimethoxysilane | 0.04 | 0.08 | 0.04 | 0.04 | 0.04 | 0.08 |
| Trimethyl terminated polydimethylsiloxane (2 cSt.) | — | 5.00 | 5.00 | — | — | 5.00 |
| Titanium dioxide: pigment | 5.00 | 7.50 | 5.00 | 5.00 | 5.00 | 7.50 |
| ammonium stearate treated ground calcium carbonate, ~3 μm particle size | 41.21 | 34.67 | 46.21 | 41.21 | 41.21 | 34.67 |

TABLE 1b

Physical Properties of Coating compositions

|  | Ref. 2 | Ref. 3 | Ex. 3 | Ex. 4 | Ex. 5 | Ex. 6 |
|---|---|---|---|---|---|---|
| Viscosity (mPa · s) ASTM D6694 | 14,000 | 120,000 | 12,000 | 21,000 | 19,000 | 83,000 |
| 7 d Tensile strength, (MPa) ASTM D2370 | 1.2 | 0.95 | 1.38 | 1.65 | 1.9 | 2.94 |
| 7 d Elongation, (%) ASTM D2370 | 142.2 | 280 | 501 | 487 | 352.1 | 1136 |
| 7 d Tear Resistance, (N/mm) ASTM D2370 | 4.413 | 5.08 | 4.2 | 3.85 | 1.78 | 10.5 |
| 7 d Modulus @ 100% Elongation, (MPa) ASTM D2370 | 1.0 | 0.67 | 1.10 | 0.77 | 0.6 | 0.3 |

In Table 1c the substrates tested were spray polyurethane foam (SPF) and atactic polypropylene (APP).

TABLE 1c

|  | Ref. 2 | Ex. 3 | Ex. 4 | Ex. 5 |
|---|---|---|---|---|
| 7 d wet peel adhesion to SPF (1), peel force, (N/m) | 0 |  |  | 4.1 |
| 7 d wet peel adhesion to unprimed APP Cap, peel force, (N/m) | 140.1 | 367.8 | 472.9 | 577.9 |
| 7 d wet peel adhesion to primed APP Cap, peel force, (N/m) | 140.1 | 262.7 | 490.4 | 332.7 |

It will be seen that the Peel force results of the examples in accordance with the invention give significantly higher results when compared to Ref. 2. Without being bound to current theories, it is believed that the resin ability to wet out the surface of the substrate improves the adhesion profile of the coating. This is particularly noticeable as the concentration of resin 1 increases in the coating.

What is claimed is:

1. A silicone elastomer composition which is storage stable, and capable of cure to an elastomeric body, the composition comprising:
    (i) an organopolysiloxane polymer having at least two hydroxyl or hydrolysable groups per molecule and of the general formula

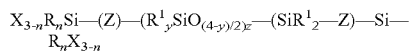

in which each X is an alkoxy group, each R is an alkyl, alkenyl or aryl group, each $R^1$ is an X group, alkyl group, alkenyl group or aryl group, and Z is a divalent organic group; and n is 0 or 1, y is 0, 1 or 2, and z is an integer such that the organopolysiloxane polymer (i) has a viscosity of from 1,000 to 75,000 mPa·s at 25° C.;
    (ii) a siloxane and/or silane cross-linker having at least three groups per molecule which are reactable with the hydroxyl or hydrolysable groups in the organopolysiloxane polymer (i);
    (iii) a solid organosilicate resin which is a product of a reaction of an organosilicate resin precursor with a treating agent such that the solid organosilicate resin is substantially unreactive with components (i) and (ii) and comprising $R^2{}_3SiO_{1/2}$ siloxane units and $SiO_{4/2}$ siloxane units, wherein the molar ratio of the $R^2{}_3SiO_{1/2}$ siloxane units to $SiO_{4/2}$ siloxane units is from 0.5:1 to 1.2:1, and $R^2$ is selected from hydrocarbon groups; the solid organosilicate resin (iii) having a weight average molecular weight of from 3,000 to 30,000 g/mol; and optionally
    (iv) a suitable condensation cure catalyst; and
    wherein the solid organosilicate resin (iii) comprises vinyl functional groups.

2. The silicone elastomer composition in accordance with claim 1, wherein the molar ratio of the total M siloxane units to total Q siloxane units of the organosilicate resin (iii) is from 0.6:1 to 0.8:1.

3. The silicone elastomer composition in accordance with claim 1, wherein the composition further comprises one or more reinforcing fillers and/or non-reinforcing fillers.

4. The silicone elastomer composition in accordance with claim 1, wherein the composition is further defined as a moisture curable sealant composition, an elastomeric coating composition, or an adhesive composition.

5. The silicone elastomer composition in accordance with claim 4, which is gunnable and/or self-levelling.

6. The silicone elastomer composition in accordance with claim 4, being the moisture curable sealant composition and which is capable of being applied as a paste to a joint between two adjacent substrate surfaces where it can be worked, prior to curing, to provide a smooth surfaced mass which will remain in its allotted position until it has cured into an elastomeric body adherent to the adjacent substrate surfaces.

7. A silicone elastomer which is the reaction product obtained by curing the silicone elastomer composition in accordance with claim 1.

8. An elastomeric coating obtained by curing the silicone elastomer composition in accordance with claim 5 on a substrate,
    (i) as a weatherproof coating for concrete and/or construction substrate surfaces;
    (ii) as or in a flashing agent;
    (iii) as or in a roof seal; and/or
    (iv) in an intumescent coating.

9. A method of applying the silicone elastomer composition in accordance with claim 1 over a roofing surface or substrate by applying the silicone elastomer composition in the form of a moisture curable elastomeric coating composition with an applicator and allowing the composition to cure.

10. The method of applying in accordance with claim 9, wherein the applicator is a sprayer, a brush, a roller, or a squeegee.

11. The method of applying in accordance with claim 9, wherein the composition at least partially penetrates into a roofing fabric prior to cure and as such the resulting elastomeric coating is in and/or on the roofing fabric once cured.

12. The silicone elastomer composition in accordance with claim 1, wherein each $R^2$ is selected from alkyl groups, cycloaliphatic groups, aryl groups, alkenyl groups, and chlorinated hydrocarbon groups.

13. The silicone elastomer composition in accordance with claim 1, wherein the solid organosilicate resin (iii) has a weight average molecular weight of from 21,000 g/mol to 30,000 g/mol.

14. A method for filling a space between two substrates to create a seal therebetween, the method comprising:
   a) providing a silicone composition; and either
   b1) applying the silicone composition to a first substrate, and bringing a second substrate in contact with the silicone composition that has been applied to the first substrate, or
   b2) filling a space formed by the arrangement of a first substrate and a second substrate with the silicone composition and curing the silicone composition;
      wherein the silicone composition is the silicone elastomer composition in accordance with claim 1.

15. The method for filling a space between two substrates in accordance with claim 14, wherein the space is filled by introducing the silicone composition by way of extrusion or through a sealant gun.

16. A method of reducing modulus and/or increasing elasticity of an elastomeric body obtained or obtainable by curing a moisture curable composition, the composition comprising:
   (i) an organopolysiloxane polymer having at least two hydroxyl or hydrolysable groups per molecule and of the general formula $$X_{3-n}R_nSi-(Z)-(R^1_y SiO_{(4-y)/2})_z-(SiR^1_2-Z)-SiR_nX_{3-n}$$

in which each X is an alkoxy group, each R is an alkyl, alkenyl or aryl group, each $R^1$ is an X group, alkyl group, alkenyl group or aryl group, and Z is a divalent organic group; and n is 0 or 1, y is 0, 1 or 2, and z is an integer such that the organopolysiloxane polymer (i) has a viscosity of from 1,000 to 75,000 mPa·s at 25° C.;
   (ii) a siloxane and/or silane cross-linker having at least three groups per molecule which are reactable with the hydroxyl or hydrolysable groups in the organopolysiloxane polymer (i); and
   optionally
   (iv) a suitable condensation cure catalyst;
      the method comprising introducing (iii) a solid organosilicate resin into the composition prior to cure, and subsequently curing the composition;
      wherein the solid organosilicate resin (iii) is a product of a reaction of an organosilicate resin precursor with a treating agent such that the solid organosilicate resin is substantially unreactive with components (i) and (ii), comprises $R^2_3SiO_{1/2}$ siloxane units and $SiO_{4/2}$ siloxane units, the molar ratio of the $R^2_3SiO_{1/2}$ siloxane units to $SiO_{4/2}$ siloxane units is from 0.5:1 to 1.2:1, and $R^2$ is selected from hydrocarbon groups; the solid organosilicate resin (iii) having a weight average molecular weight of from 3,000 to 30,000 g/mol; and
   wherein the solid organosilicate resin (iii) comprises vinyl functional groups.

17. A method of preparing a silicone elastomeric sealant composition which is stable in the absence of moisture and cures upon exposure to moisture, the method comprising:
   (A) mixing in the absence of moisture components (i), (ii), and (iii), and optionally component (iv), to form a mixture;
   (i) an organopolysiloxane polymer having at least two hydroxyl or hydrolysable groups per molecule and of the general formula $$X_{3-n}R_nSi-(Z)-(R^1_y SiO_{(4-y)/2})_z-(SiR^1_2-Z)-SiR_nX_{3-n}$$

in which each X is an alkoxy group, each R is an alkyl, alkenyl or aryl group, each $R^1$ is an X group, alkyl group, alkenyl group or aryl group, and Z is a divalent organic group; and n is 0 or 1, y is 0, 1 or 2, and z is an integer such that the organopolysiloxane polymer (i) has a viscosity of from 1,000 to 75,000 mPa·s at 25° C.;
   (ii) a siloxane and/or silane cross-linker having at least three groups per molecule which are reactable with the hydroxyl or hydrolysable groups in the organopolysiloxane polymer (i);
   (iii) a solid organosilicate resin which is a product of a reaction of an organosilicate resin precursor with a treating agent such that the solid organosilicate resin is substantially unreactive with components (i) and (ii) and comprising $R^2_3SiO_{1/2}$ siloxane units and $SiO_{4/2}$ siloxane units, wherein the molar ratio of the $R^2_3SiO_{1/2}$ siloxane units to $SiO_{4/2}$ siloxane units is from 0.5:1 to 1.2:1, and $R^2$ is selected from hydrocarbon groups; the solid organosilicate resin (iii) having weight average molecular weight of from 3,000 to 30,000 g/mol;
   (iv) a suitable condensation cure catalyst; and
   wherein the solid organosilicate resin (iii) comprises vinyl functional groups; and
   (B) storing the mixture in the absence of moisture.

* * * * *